United States Patent [19]
Worst

[11] 3,978,693
[45] Sept. 7, 1976

[54] BELT DRIVE MECHANISM FOR AUTOMATIC CLOTHES WASHING MACHINE

[75] Inventor: Joseph C. Worst, Louisville, Ky.

[73] Assignee: General Electric Company, Louisville, Ky.

[22] Filed: Sept. 15, 1975

[21] Appl. No.: 613,264

[52] U.S. Cl. .............................. 68/12 R; 68/23.7; 74/242.11 A
[51] Int. Cl.² .................. D06F 23/04; D06F 37/38
[58] Field of Search ............... 68/12 R, 23.7, 23 R, 68/24; 74/242.11 A, 242.14 R

[56] References Cited
UNITED STATES PATENTS

| | | | |
|---|---|---|---|
| 2,200,175 | 5/1940 | Kaestner | 74/242.14 R X |
| 2,869,699 | 1/1959 | Bochan | 68/23.7 X |
| 3,029,624 | 4/1962 | Fogt | 68/23.6 |
| 3,057,218 | 10/1962 | Knerr et al. | 74/242.9 |
| 3,324,691 | 6/1967 | Smith | 68/24 |
| 3,525,241 | 8/1970 | Morton | 68/23.7 |

FOREIGN PATENTS OR APPLICATIONS

| | | | |
|---|---|---|---|
| 72,286 | 7/1931 | Norway | 74/242.11 A |

*Primary Examiner*—Philip R. Coe
*Attorney, Agent, or Firm*—Frederick P. Weidner; Francis H. Boos

[57] ABSTRACT

A belt drive mechanism for an automatic clothes washing machine having a timer to control the operational cycles of the machine, a basket supported for rotation, and a vaned structure for agitating the clothes in the basket. A motor provides a plurality of operational modes and has a start winding and a run winding. There is an input shaft connected with the motor by a belt and coupled to the vaned structure for agitation thereof for a first mode of operation of the motor and coupled to the basket for effecting rotation thereof during a second mode of operation of the motor. An idler pulley engages the belt with means arranged for biasing the pulley against the belt to place tension on the belt and means including the motor windings to overcome the pulley biasing means during energization of the motor start winding to thereby release tension on the belt.

10 Claims, 5 Drawing Figures

BELT DRIVE MECHANISM FOR AUTOMATIC CLOTHES WASHING MACHINE

BACKGROUND OF THE INVENTION

1. Field of the Invention

This invention relates to laundry machines, and more particularly to a belt drive mechanism used in automatic clothes washers.

2. Description of the Prior Art

Automatic clothes washing machines have at least two modes of operation, a washing mode and a spin mode. During the washing mode the vertical center post vaned structure or agitator is oscillated by means of a motor driven belt drive mechanism through a transmission. At the start of the washing mode there is a considerable load on the motor because the clothes washing machine is full of the clothes to be washed and wash water. Considerable weight needs to be initially rotationally moved during startup of the motor and it is desirable to reduce the torque requirements on the motor at that time. In the spin mode there also needs to be provided a means to reduce the torque required of the motor in order to prevent overloading thereof without requiring a larger and more expensive motor. It is, therefore, desirable to provide some means of relieving the belt tension and thereby reducing the torque required of the motor during the initial stages of the washing mode and the spin mode. This is particularly true when there are occurrences of abnormally low voltage being available to the motor which reduces its torque capabilities during startup.

After the wash mode is completed the clothes washing machine is programmed by its controls to pump the wash liquid out of the tub to an external drain. This may be done by spinning the basket containing the clothes and having the liquid being pumped out of the machine during the spin operation. It is desirable, however, to provide for removal of the liquid by the motor driven pump without the motor also being required to operate some other function of the machine such as agitating the vaned structure or spinning the basket containing the clothes. Such a system enhances subsequent liquid extraction from the clothes during the spin mode.

Belt drive systems in laundry machines wherein belt tension is relieved during certain operational modes of the machine have been employed. One example is shown in U.S. Pat. No. 3,525,241 wherein a solenoid actuated mechanism relieves an idler pulley from tensioning the belt thus allowing belt slippage in only the spin mode of operation. Another prior art arrangement is shown in U.S. Pat. No. 3,324,691 wherein a solenoid is operable to disengage an idler pulley from a drive belt and effect a slipping belt drive during high speeds to limit torque input to the washer basket during the spin operation.

By my invention I have improved the prior art belt drive mechanisms to provide a means for assuring that the belt will slip during startup of the motor in both the wash and spin modes of operation and it also provides, if desired, for not operating either the agitator or the rotation of the basket during operation of the pump to remove liquid from the machine prior to the spin mode.

SUMMARY OF THE INVENTION

There is provided a belt drive mechanism for an automatic clothes washing machine having a timer to control the operational cycles of the machine, a basket supported for rotation, and a vaned structure or agitator for moving the clothes in the basket, and a single motor having a start winding and a run winding and which provides a plurality of operational modes for the machine. There is an input shaft for selectively either oscillating the agitator or rotating the basket which input shaft is connected to the motor by a continuous belt. There is transmission means providing coupling between the input shaft and the agitator for the first mode of operation of the motor and for coupling the input shaft to the basket for effecting rotation thereof during a second mode of operation of the motor. An idler pulley engages the belt and there is means for biasing the pulley against the belt and means including the motor windings to overcome the pulley biasing means during energization of the motor start winding. The means to overcome the pulley biasing means may also be responsive to a switch which may either be manually operated or automatically operated by the timer of the machine.

DESCRIPTION OF THE PREFERRED EMBODIMENT

Figure 1:
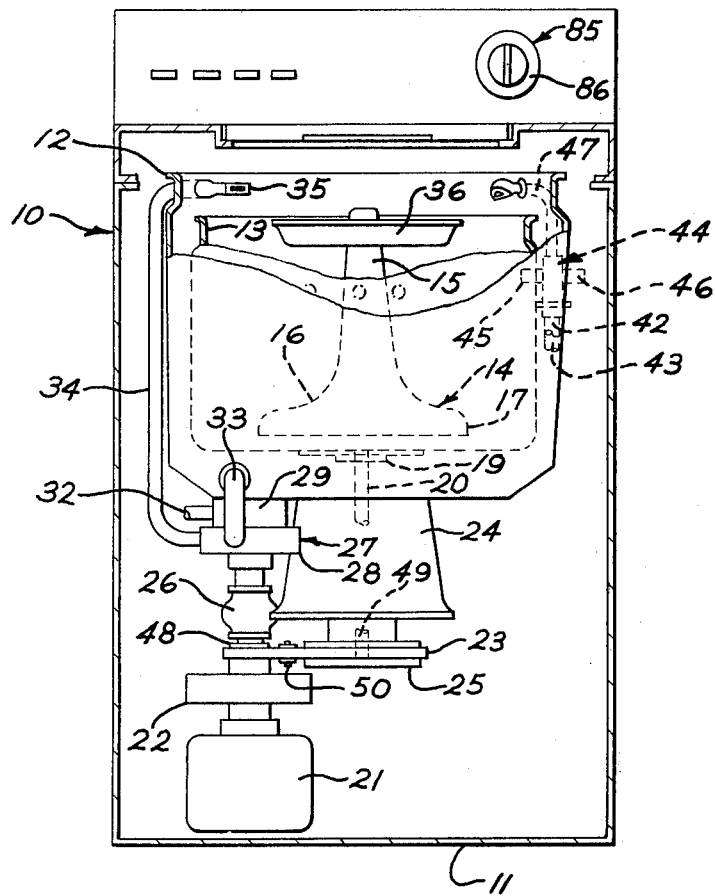
FIG. 1 is a schematic front elevational view of a clothes washing machine incorporating my invention, the view being partly broken away and partly in section.

Referring now to the drawing, and initially to FIG. 1 thereof, there is illustrated an agitator-type vertical-axis automatic clothes washer 10 having a supporting structure or load member 11. The washer may include the various operational components conventionally utilized in a domestic automatic washing machine, for instance, an imperforate tub 12 rigidly mounted within structure 11. Rotatably supported within tub 12 is a perforate washing basket 13 for washing and rinsing clothes therein and for centrifugally extracting liquid therefrom. At the center of basket 13 there is provided an agitator 14 which includes a center post 15 having a plurality of water or liquid circulating vanes 16 joined at their lower end to form an outwardly flared skirt 17.

Both the clothes basket 13 and the agitator 14 are rotatably mounted. The basket 13 is mounted on a hub 19 and the agitator 14 is mounted on a shaft 20 which extends upwardly through the hub 19 and through the center post 15 and is secured to the agitator so as to drive it. During one possible cycle of operation of the washer 10, fabrics, detergent and a predetermined quantity of liquid are introduced into the tub 12 and basket 13, and the agitator is then oscillated back and forth about its axis to move the clothes within the basket. After a predetermined period of this washing action, the agitator and basket 13 are rotated in unison at high speed to centrifugally extract the washing liquid from the fabrics and discharge it to a drain (not shown). Following this extraction operation, a supply of clean liquid is introduced into the basket for rinsing the fabrics and the agitator is again oscillated. Finally, the agitator and basket are once more rotated in unison at high speed to extract the rinse liquid.

The basket 13 and agitator 14 may be driven by any suitable means. By way of example, I have shown them as driven by a reversible motor 21 through a drive mechanism including a clutch 22 mounted on the motor shaft. The motor is tailored so as to be used to its full extent when it accelerates the basket 13 to spin speed. In order to assist the motor during starting, clutch 22 allows the motor to start with less than a full load and then accept the full load as it comes up to speed. A suitable belt 23 transmits power from clutch 22 to a transmission assembly 24 through a pulley 25. Thus, depending upon the direction of motor rotation, the pulley 25 of transmission 24 is driven in opposite directions. The transmission 24 is so arranged that it supports and drives both the agitator drive shaft 20 and the basket mounting hub 19. When motor 21 is rotated in one direction, the transmission causes agitator 14 to oscillate and when motor 21 is driven in the opposite direction, the transmission causes the clothes basket 13 and agitator 14 to rotate together at high speed for centrifugal fluid extraction. An idler pulley 50 is positioned between the clutch pulley 48 and pulley 25 and its function will be discussed later.

In addition to operating the transmission 24 as described, motor 21 also provides a direct drive through a flexible coupling 26 to a pump structure 27, which includes two separate pumping units 28 and 29 which are operated simultaneously in the same direction by motor 21. Pump unit 29 has an inlet connected to the tub 12 and an outlet connected by a conduit 32 to a suitable external drain (not shown). Pump 28 has an inlet connected by a conduit 33 to the interior of tub 12 and an outlet connected by conduit 34 to a nozzle 35 which is positioned to discharge into a suitable perforate bottomed filter pan 36 which may be secured to the top portion of agitator 14 so as to be movable therewith but removable therefrom. With this structure, then, when the motor 21 is operating so as to provide the washing mode or agitation, pump unit 28 draws liquid in from tub 12 and discharges it through conduit 34 into filter pan 36, and then down through the small openings provided in the bottom of the filter pan back into the basket. Conversely, when the motor is reversed so as to rotate the basket 13 and agitator 14 together at high speed to centrifugally extract fluid from fabrics in the basket, pump unit 29 will draw liquid from the tub and discharge it through conduit 32 to drain. Each of the pump units is substantially inoperative in the direction of rotation in which it is not used.

Hot and cold water may be applied to the machine through conduits 42 and 43 which are adapted to be connected respectively to sources of hot and cold water (not shown). Conduits 42 and 43 extend into a conventional mixing valve structure 44 having solenoids 45 and 46 and being connected to a hose 47. In a conventional manner selective or concurrent energization of solenoids 45 and 46 will provide the passage of hot, cold or warm water from the mixing valve 44 through the hose 47. Hose 47 is positioned to discharge into the basket 13 so that when one or both of solenoids 45 and 46 are energized, water enters basket 13 and tub 12.

Figure 2:
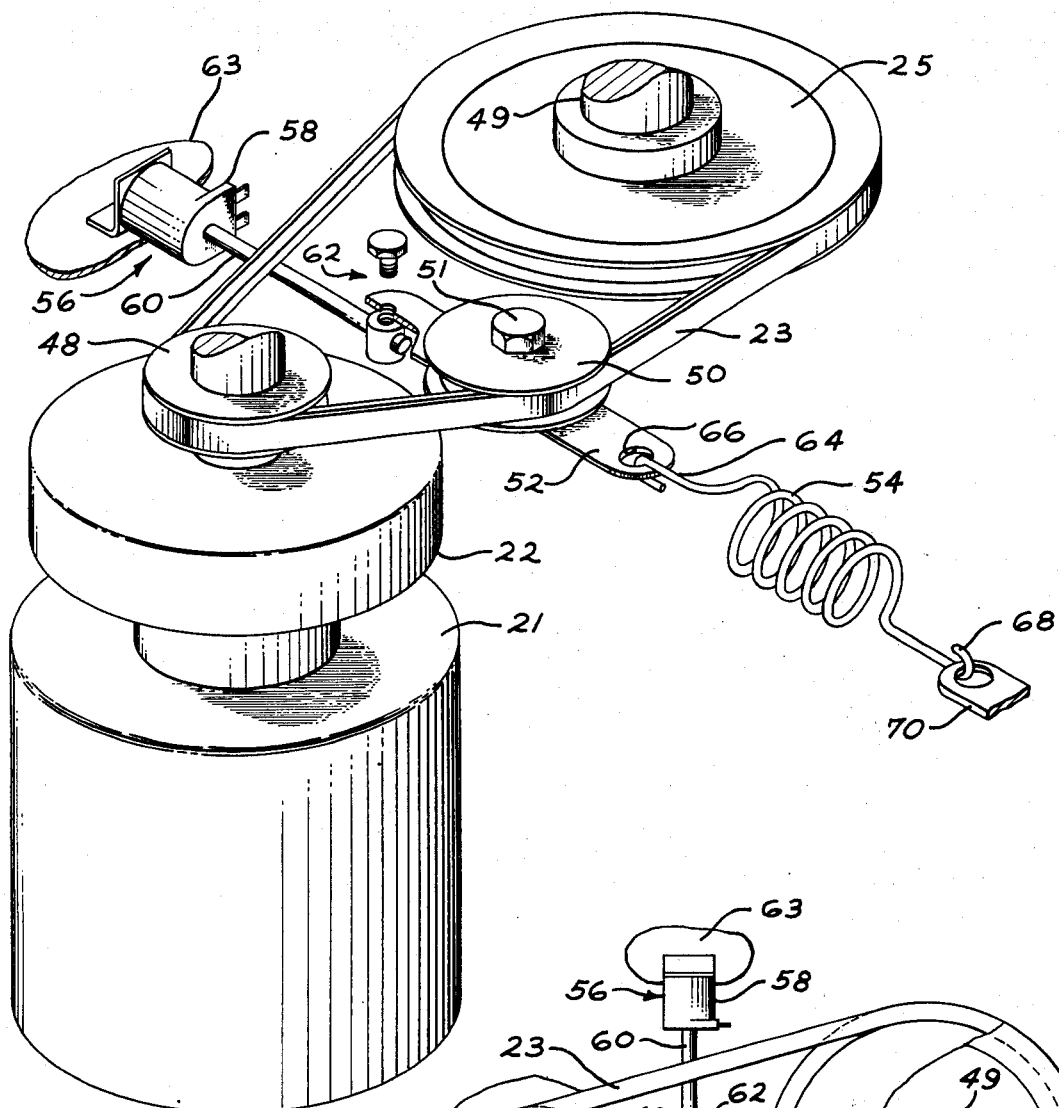
FIG. 2 is a perspective view of the belt drive mechanism arrangement utilized in the present invention. This figure shows the belt under tension.
Figure 3:
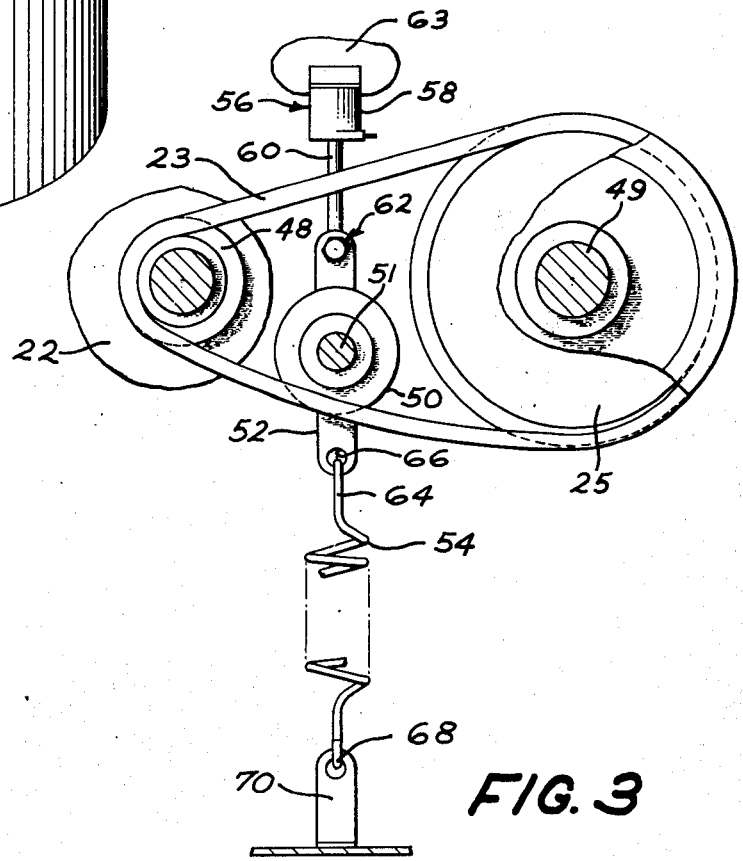
FIG. 3 is a top plan view of the belt drive mechanism arrangement of FIG. 2 wherein the belt tension is in the released or slipping position.

With reference to FIGS. 2 and 3, the belt drive mechanism arrangement utilized in this invention is shown in detail. Electric motor 21 utilized for driving the agitator 14 in the wash mode and rotating the basket 13 and agitator 14 in the spin mode is usually for economy reasons, an induction type motor. These type of motors inherently have low starting torque capability. Therefore, it is highly desirable to be able to reduce the torque requirements of the motor during its initial startup period. At the initiation of the wash mode, the torque requirements on the motor are quite high because the washing machine contains the load of clothes to be washed and the tub is filled with water thus causing consideration impedance to the oscillatory movement of the agitator. While the clutch 22 may lessen the torque requirements to some degree it may not be sufficient under certain conditions, such as low voltage input to the motor to adequately reduce to torque requirements. During the spin mode the basket is rotated at high speed to effect extraction of liquid from the clothes and those clothes are, of course, sopping wet with considerable weight, especially for a high speed operation. The reduction of torque required of the motor is particularly advantageous to compensate for periods of low house voltage as may be experienced, which low voltage results in reduced torque capability of the motor. Clutch 22 is operable from the electric motor drive shaft and has a clutch pulley 48 which is grooved to receive an endless V-belt 23. The driven component is an input shaft 49. The input shaft 49 is rotated by a grooved pulley 25 secured thereto which is rotatably mounted and driven by belt 23. Thus there is provided a means including the belt for connecting the motor and input shaft for driven movement thereof. Between pulley 25 and clutch pulley 48 there is an idler pulley 50 which is also peripherally grooved to engage the belt 23. Idler pulley 50 is rotatably secured by an axle 51 to a rigid movable member 52 which has secured at one end thereof a coiled spring 54 and at the other end thereof a solenoid assembly 56. The solenoid assembly conventionally includes an electrically energized coil of insulated wire located in the solenoid housing 58 which coil when energized moves a rod 60. Rod 60, at the end opposite the coil, is secured to member 52 by a suitable bolt assembly 62. The solenoid housing 58 is secured to a stationary member 63 to prevent its movement. The coiled spring 54 has its one end 64 in the shape of a hook and engages a hole 66 in member 52. The opposite end 68 of the spring 54 is also hook-shaped and engages a stationary structural member 70.

The arrangement shown in FIG. 2 demonstrates the belt drive mechanism in a position whereby the belt is placed under tension and this is accomplished by spring 54 urging member 52 carrying with it idler pulley 50 toward the belt 23. In this position the solenoid assembly 56 is not energized. FIG. 3 shows the belt drive mechanism in a condition whereby tension on the belt is released and this is accomplished by energization of the solenoid assembly 56 pulling the rod 60 and member 52 carrying idler pulley 50 away from the belt and overcoming the tension of spring 54.

Figure 4:
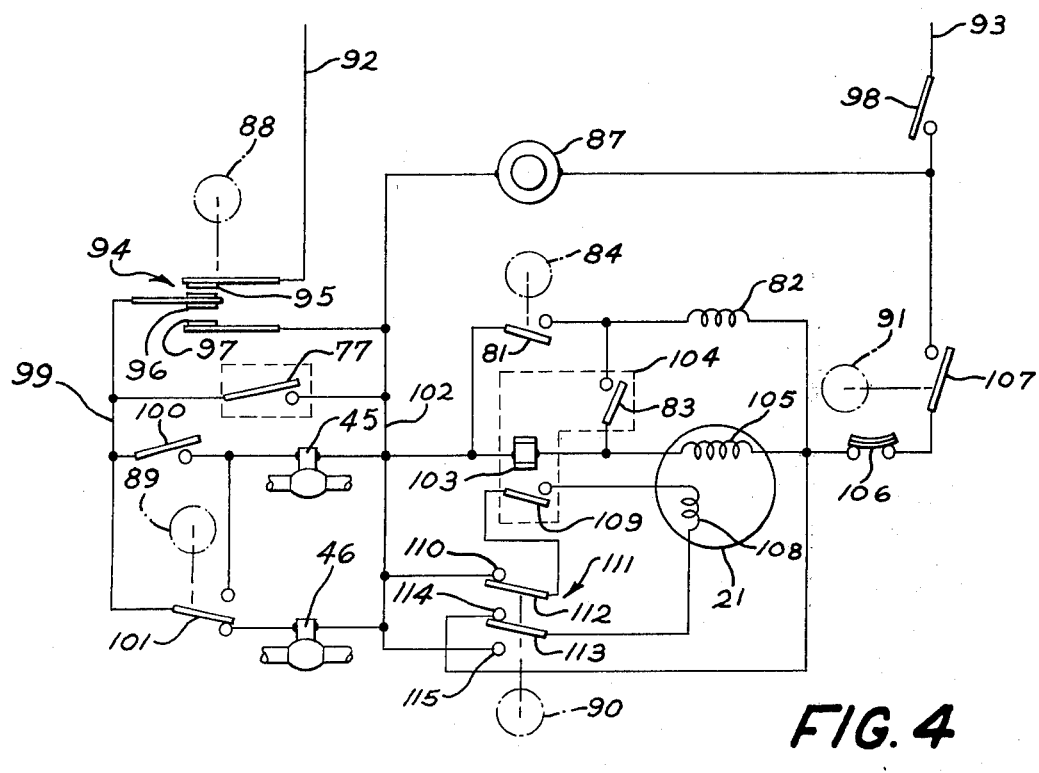
FIG. 4 is a schematic diagram of an electric control circuit that may be used with my invention in the machine of FIG. 1.

Completing now the description of the electrical control system for the machine of FIG. 1, reference is made to FIG. 4. At the heart of this control system is a sequence control assembly designated generally in FIG. 1 by the numeral 85 having a dial 86. Forming a part of the sequence control assembly 85 is a timer motor 87 which drives a plurality of cams 84, 88, 89, 90 and 91. These cams, during their rotation by the timer motor, actuate various switches (as will be described), causing the machine to pass through the cycle of operations which includes washing, spinning, rinsing and spinning.

It will be understood that present day washers often include various improvements such as control panel lights, etc., which do not relate to the present invention and have been omitted for the sake of simplicity and ease of understanding.

The electric circuit, as shown in FIG. 4, as a whole is energized from a power supply (not shown) through a pair of conductors 92 and 93. Cam 88 controls a switch 94 which includes contacts 95, 96 and 97; when the cam has assumed the position where all three contacts are separated, washer 10 is disconnected from the power source and is inoperative. When operation of washer 10 is to be initiated as will be explained below, switch 94 is controlled by cam 88 so that contacts 95 and 96 are engaged. When a main switch 98 is closed (by any suitable manual control, not shown), power is then provided to the control circuit of the machine from conductor 92 through contacts 95 and 96.

From contact 96, the circuit extends through a conductor 99 and a manually operated switch 100 to the valve solenoid 45. In addition, a circuit is completed from conductor 99 through a switch 101 controlled by cam 89. In the "up" position, switch 101 completes a circuit for solenoid 45 independently of switch 100; in the "down" position shown, the switch 101 completes a circuit for solenoid 46. Thus, when switch 100 is open, energization of solenoids 45 and 46 is under the control of switch 101, but when switch 100 is closed the cold water solenoid 45 may be energized independently of the position of switch 101. From the hot and cold water solenoids, the energizing circuit then extends through a conductor 102 and then to a coil 103 of a relay 104, the main or run winding 105 of motor 21, a conventional motor protector 106, a switch 107 controlled by cam 91, and the conductor 93.

Motor 21 is of the conventional induction type which is provided with a start winding 108 which assists the main winding 105 during starting of the motor and is energized in parallel therewith. When a relatively high current passes through the relay coil 103, it causes the normally open switch 109 to close; this permits an energizing circuit for the start winding to be completed in parallel with the main winding through a contact 110 of the switch generally indicated at 111 and which is controlled by cam 90, contact arm 112, the relay contact 109, the start winding 108, a contact arm 113, and the contact 114 of switch 111. A circuit is also completed to close normally open switch 83 to thereby energize solenoid 82 at full line voltage thus overcoming the pulley biasing spring 54 to remove tension from belt 23. A circuit is also completed in parallel with motor 21 through the timer motor 87. Relay 104 is designed to close contact 109 when a relatively high current, of the level demanded by the motor when the motor is rotating below a predetermined speed, is passing through it. At other times, when there is no current passing through the relay coil 103 or when the current is below the required energizing level as is true in the running speed range of the motor, the contact 109 is open.

When the main winding 105 of motor 21 is in series with valve solenoids 45 and 46, as described, a much lower impedance is presented in the circuit by the motor 21 than is presented by the valve solenoids. As a result, the greater portion of the supply voltage is taken up across the solenoids and relatively little across the motor. This causes whichever of the solenoids is connected in the circuit to be energized sufficiently to open its associated water valve. As a result, water at a selected temperature is admitted to the machine through hose 47, motors 21 and 87 remaining inactive.

This action continues, with the circuitry thus arranged, so that water is admitted to basket 13 and tub 12. Because of the perforations in basket 13, the water rises in both basket 13 and tub 12 at the same rate. Water level control switch 77 is connected across conductors 99 and 102 as shown, so that when switch 77 closes, it excludes the solenoids 45 and 46 from the effective circuit by short circuiting them. As a result, the solenoids become de-energized and a high potential drop is provided across winding 105 of motor 21. This causes the relay 104 to close contact 109 to start the motor 21 while, at the same time, timing motor 87 starts so as to initiate the sequence of operations. It will be observed that the energization of the valve solenoids 45 and 46 on the one hand, and the energization of the drive motor 21 on the other hand are alternative in nature. In other words, when there is sufficient potential across the valve solenoids to energize them, the motor remains de-energized, and it is necessary to short the solenoids out of the circuit so that they are de-energized before the drive motor can be energized.

The switch 107 is in series with the main motor 21 but is not in series with the timer motor 87. Thus, by the opening of switch 107, the energization of motor 21 may be stopped. The timer motor will continue to operate though, as a result of the fact that the timer motor 87 is deliberately provided with an impedance much greater than that of the valve solenoids so that it will take up most of the supplied voltage and the solenoids therefore do not operate their respective valves.

A further point of the circuit of FIG. 4 is that when switch arms 112 and 113 are moved by cam 90 to engage contact 114 and a contact 115 respectively, the polarity of the start winding is reversed. The circuit from conductor 102 then proceeds through contact 115, contact arm 113 to start winding 108, relay contact 109, contact arm 112 and contact 114 to the protective device 106 and conductor 93. Thus, provided motor 21 is stopped or slowed down so that relay contact 109 is closed, the reversal of switch 111 is effective to cause the motor 21 to rotate in the opposite direction when the motor is started up again.

In order to energize motor 21 independently of the water level switch 77 and the valve solenoid, so that a spin operation may be provided without regard to the absence of the predetermined water level, cam 88 is formed so that it may close all three contacts 95, 96 and 97 of switch 94 during centrifugal liquid extraction steps. When this occurs, it causes the power to be supplied from conductor 92 directly through contact 97 to conductor 102 and the motor rather than through the water level switch or the valve solenoids.

Figure 5:
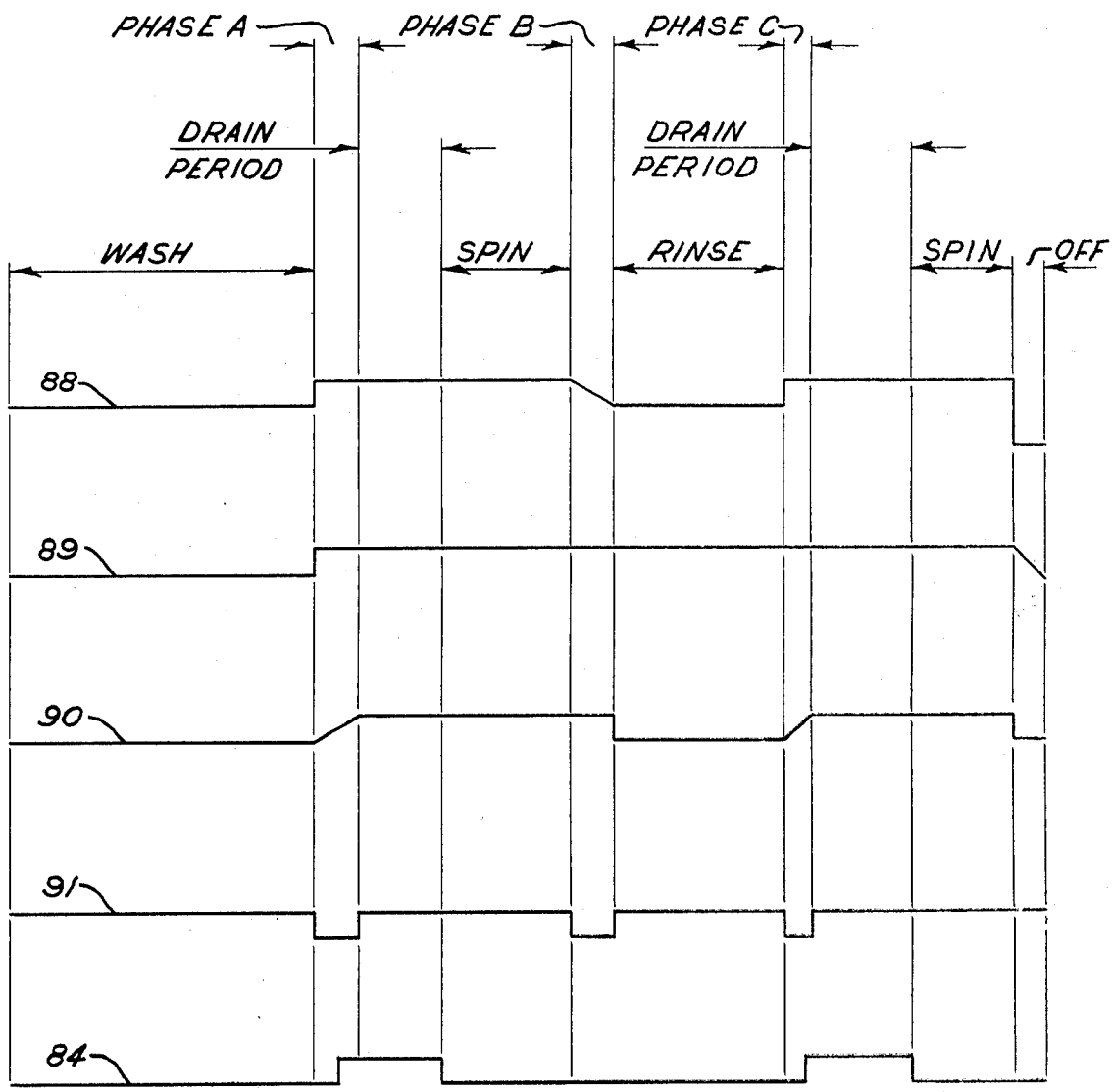
FIG. 5 is a schematic view of the cam surfaces used in the control of the timer operated switches of FIG. 4.

Referring now to FIG. 5 in conjunction with FIGS. 1 and 4, a sequence of operations of the washer 10 will be described. It will be assumed that the timer has been set at the beginning of the wash step so that cam 88 has caused contacts 95 and 96 to be closed, cam 89 has caused contact 101 to move to its "down" position, cam 90 has positioned switch 111 as shown, and cam 91 has closed switch 107. At this point, with main switch 98 closed, the first step which takes place, because of the aforementioned impedance relationship, is the filling of the machine with water by the energization either of the solenoid 46 alone to provide hot water or else, if switch 100 has been manually closed, by the energization of solenoids 45 and 46 together to cause warm water to be provided to the machine. The energization of the solenoids causes motors 21 and 87 to remain inactive until the closure of switch 77 at a predetermined liquid level.

At this point, the solenoids are de-energized and, consequently, motors 21 and 87 are energized. Normally open switch 83 is closed and solenoid 82 is energized to effect release of belt tension during energization of the motor start winding. When the motor start winding 108 is de-energized so is solenoid 56, thus allowing spring 54 to bias idler pulley 50 against belt 23 and place tension thereon. The energization of motor 21 is in the direction to cause agitator operation (because of switch 111) and to provide a recirculation action by pump 28, drawing water from the tub through inlet conduit 33 and then discharging it back into the tub through outlet conduit 34. This action, which conventionally is called the washing operation or wash mode, continues for a predetermined time until pause A is reached, at which time cam 91 opens switch 107. This stops the operation of motor 21 and consequently there is no further agitation although, as explained, the timer motor 87 continues to operate. During pause A, cam 88 closes all three contacts 95, 96 and 97 of switch 94 together to connect conductor 102 entirely independently of water level switch 77 and so as to exclude the valve solenoids 45 and 46. Also at this time cam 90 reverses the position of switch 111. The reversal of switch 111 reverses the polarity of start winding 108 relative to main winding 105. As a result, when switch 107 is re-closed by cam 91, motor 21 is energized once again but in the opposite direction. This is the end of pause A. The motor 21 is then driving the pump 29. During pause A, cam 84 closes switch 81 to energize solenoid 82 to release the belt tension thus preventing rotation of the basket after pause A and during the drain period when the tub is being drained by pump 29. At the end of the drain period cam 84 opens switch 81 and solenoid 82 is de-energized thus allowing full belt tension to again be applied. The energization of the motor 21 and the de-energization of the valve solenoids result from the fact that the valve solenoids are bypassed by the new condition of switch 94. As a result of the opposite rotation of motor 21 from that of the wash mode, the motor causes a spin operation and simultaneously operates the pump 29. The pump 28 is ineffective during this operation, tending to draw in fluid through conduit 34 and expel it through conduit 33.

The spin operation is provided at a relatively high speed of rotation of the basket which may, for instance, be on the order of 600 r.p.m. so as to extract a very substantial part of the liquid from the clothes and have it removed by the pump 29. The spin operation continues until pause B, as shown in FIG. 5, at which time switch 107 is again opened by cam 91 to de-energize motor 21. At this time, cam 88 returns switch 94 to the same position that it had for wash. In addition, it is conventional at this time to change the position of switch 101 to its "up" position so that the cold water solenoid is energized. Switch 94 also returns to the same position that it had for wash, with the contact 97 disengaged from the other two contacts, and the motor connections are reversed to provide agitation rather than spin action. Thus, when pause B is terminated by the reclosing of the switch 107 by cam 91, water enters the basket until the switch 77 is tripped, and then an agitation step proceeds in the same manner as the wash step, that is, by the shorting out of the valve solenoid by switch 77. Also again, normally open switch 83 is closed and solenoid 82 is energized to effect release of belt tension during energization of the motor start winding.

After a suitable rinsing period, another pause designated C, is provided and also a drain period followed by another spin operation performed in the same manner as before between the wash and spin modes, after which cam 88 opens all three contacts of switch 94 to terminate the operation completely by de-energizing all components of the system.

It should be noted that while the use of a relay 104 is shown and described in the preferred embodiment above, a motor having a centrifugal switch for controlling the start winding may be used in place of the relay 104 and accomplish the same desirable function. Therefore, the function of relay 104 and the function of a centrifugal switch that controls the start winding of the motor are equivalent in operative effect.

The foregoing is a description of the preferred embodiment of the invention and variations may be made thereto without departing from the true spirit of the invention, as defined by the appended claims.

I claim:

1. A belt drive mechanism for an automatic clothes washing machine having a timer to control the operational cycles of the machine, a basket supported for rotation, and a vaned structure for agitating the clothes in the basket, comprising:
    a. a motor having a start winding and a run winding and providing a plurality of operational modes,
    b. an input shaft,
    c. means including a belt connecting said motor and said input shaft,
    d. means providing coupling between the input shaft and (i) the vaned structure for agitation thereof for the first mode of operation of the motor, (ii) the basket for effecting rotation thereof during a second mode of operation of the motor,
    e. an idler pulley for engaging the belt,
    f. means for biasing the pulley against the belt to place tension on the belt, and
    g. means including the motor windings to overcome the pulley biasing means during energization of the motor start winding to thereby release tension on the belt.

2. The belt drive mechanism of claim 1 wherein the means to overcome the pulley biasing means includes an electrically actuated solenoid.

3. The belt drive mechanism of claim 2 wherein the means to overcome the pulley biasing means includes a relay for actuating the solenoid.

4. The belt drive mechanism of claim 2 wherein the means to overcome the pulley biasing means includes a centrifugal switch responsive to the speed of the motor for actuating the solenoid.

5. The belt drive mechanism of claim 1 wherein the means to overcome the pulley biasing means is also responsive to actuation of a switch.

6. The belt drive mechanism of claim 5 wherein the switch is actuated by the timer.

7. The belt drive mechanism of claim 6 wherein the switch is actuated by the timer between the end of the first mode of operation of the motor and the beginning of the second mode of operation of the motor.

8. The belt drive mechanism of claim 1 wherein the means for biasing the pulley against the belt is a coiled spring connecting the pulley and a stationary member.

9. The belt drive mechanism of claim 8 wherein the means to overcome the coiled spring includes an electrically actuated solenoid with a rod movable in response to actuation of the solenoid, and cooperatively connected to the spring.

10. The belt drive mechanism of claim 9 wherein the idler pulley is rotatably attached to a support member with the spring attached at one end of the member and the solenoid rod attached to the opposite end of the member.

* * * * *